United States Patent
Lee

(10) Patent No.: US 9,122,468 B2
(45) Date of Patent: *Sep. 1, 2015

(54) HOST APPARATUS CONNECTED TO IMAGE FORMING APPARATUS AND POWER SAVE MODE CONTROL METHOD THEREOF

(71) Applicant: Samsung Electronics Co., Ltd., Suwon-si (KR)

(72) Inventor: Sung-ki Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,822

(22) Filed: Jul. 15, 2013

(65) Prior Publication Data

US 2013/0305072 A1    Nov. 14, 2013

Related U.S. Application Data

(63) Continuation of application No. 12/252,622, filed on Oct. 16, 2008, now Pat. No. 8,516,286.

(30) Foreign Application Priority Data

Dec. 10, 2007 (KR) ........................ 10-2007-0127825

(51) Int. Cl.
 *G06F 1/26* (2006.01)
 *G06F 1/32* (2006.01)

(52) U.S. Cl.
 CPC ................ *G06F 1/26* (2013.01); *G06F 1/3215* (2013.01); *G06F 1/3284* (2013.01)

(58) Field of Classification Search
 USPC .................................................. 713/300–324
 See application file for complete search history.

(56) References Cited

U.S. PATENT DOCUMENTS

| | | |
|---|---|---|
| 5,900,026 A | 5/1999 | Ryu |
| 5,923,889 A | 7/1999 | Kim et al. |
| 5,937,148 A | 8/1999 | Okazawa |
| 6,166,355 A | 12/2000 | Watanabe et al. |
| 6,349,304 B1 | 2/2002 | Boldt et al. |
| 6,385,412 B1 | 5/2002 | Sadakuni |

(Continued)

FOREIGN PATENT DOCUMENTS

| | | |
|---|---|---|
| JP | 2004-284280 | 10/2004 |
| JP | 2006-5883 | 1/2006 |

(Continued)

OTHER PUBLICATIONS

"Hardware/Software Tradeoffs: A General Design Principle?"— Brian Randell, Computing Laboratory, The University of Newcastle upon Tyne; 3 pages, Dated: Jan. 25, 1985.*

(Continued)

*Primary Examiner* — Brian Misiura
(74) *Attorney, Agent, or Firm* — Staas & Halsey LLP

(57) ABSTRACT

A method of controlling a power save mode of an image forming apparatus connected to a host apparatus, the method includes: requesting information on a power mode of the image forming apparatus; transmitting the power mode information and information on an entering time for a power save mode of the image forming apparatus from the image forming apparatus; and displaying the entering time for the power save mode of the image forming apparatus on a basis of the entering time information.

17 Claims, 5 Drawing Sheets

(56) References Cited

U.S. PATENT DOCUMENTS

| | | |
|---|---|---|
| 6,493,100 B1 | 12/2002 | Endo et al. |
| 6,594,767 B1 | 7/2003 | Wiley et al. |
| 6,785,727 B1 | 8/2004 | Yamazaki |
| 7,203,848 B2 | 4/2007 | Mitsubori et al. |
| 7,398,405 B2 | 7/2008 | Aoki et al. |
| 8,516,282 B2 * | 8/2013 | Miyazaki ..................... 713/320 |
| 2006/0269341 A1 | 11/2006 | Aoki et al. |
| 2007/0097424 A1 | 5/2007 | Mizuno |

FOREIGN PATENT DOCUMENTS

| | | |
|---|---|---|
| JP | 2006-334931 | 12/2006 |
| JP | 2007-94929 | 4/2007 |
| KR | 10-1998-0014460 | 5/1998 |
| KR | 10-0612652 | 8/2006 |

OTHER PUBLICATIONS

Korean Office Action for related Korean Patent Application No. 10-2007-0127825, mailed on Jun. 8, 2012.
Japanese Office Action for related Japanese Patent Application No. 2008-314901, mailed on Aug. 23, 2012.
Korean Notice of Allowance issued Nov. 23, 2012 in corresponding Korean Patent Application No. 10-2007-0127825.
Japanese Office Action issued Apr. 23, 2013 in corresponding Japanese Patent Application No. 2008-314901.
US Notice of Allowance mailed Apr. 16, 2013 in U.S. Appl. No. 12/252,622.
US Office Action mailed Dec. 27, 2012 in U.S. Appl. No. 12/252,622.
US Office Communication mailed Nov. 8, 2012 in U.S. Appl. No. 12/252,622.
US Notice of Allowance mailed Sep. 6, 2012 in U.S. Appl. No. 12/252,622.
US Office Action mailed Jun. 25, 2012 in U.S. Appl. No. 12/252,622.
US Office Action mailed Feb. 27, 2012 in U.S. Appl. No. 12/252,622.
US Advisory Action mailed Nov. 2, 2011 in U.S. Appl. No. 12/252,622.
US Office Action mailed Jul. 26, 2011 in U.S. Appl. No. 12/252,622.
US Office Action mailed Jan. 13, 2011 in U.S. Appl. No. 12/252,622.
U.S. Appl. No. 12/252,622, filed Oct. 16, 2008, Sung-ki Lee, Samsung Electronics Co., Ltd.

* cited by examiner

HOST APPARATUS CONNECTED TO IMAGE FORMING APPARATUS AND POWER SAVE MODE CONTROL METHOD THEREOF

CROSS-REFERENCE TO RELATED APPLICATION

This application is a Continuation of U.S. patent application Ser. No. 12/252,622, filed Oct. 16, 2008 which claims the benefit of Korean Application No. 10-2007-127825, filed Dec. 10, 2007, in the Korean Intellectual Property Office, the disclosures of which are incorporated herein by reference.

BACKGROUND OF THE INVENTION

1. Field of the Invention

Aspects of the present invention relate to a host apparatus connected to an image forming apparatus and a power save mode control method thereof, and more particularly, to a host apparatus which indicates a power mode of an image forming apparatus, and a power save mode control method thereof.

2. Description of the Related Art

In general, an image forming apparatus, such as a printer, a multi function device, a copier, etc., has a power save mode in which power to be supplied to some components thereof, for example, a fusing unit, is cut off to reduce power consumption while the image forming apparatus does not perform a printing operation for a predetermined time. To perform the printing operation after entering the power save mode, a temperature of the fusing unit and conditions of other components of the image forming apparatus should return to a normal state. To this end, warm-up of the image forming apparatus is necessary.

Specifically, the image forming apparatus performs a warm-up operation when it receives printing data from a host apparatus, and then, once warmed-up, performs the printing operation. Due to the warm-up, time elapses before performing the printing operation after entering the power save mode compared with the normal mode. Thus, an urgent printing operation can not be performed quickly after entering the power save mode.

Particularly, if the host apparatus, giving a printing command, and the image forming apparatus, performing the printing operation, are distantly spaced from each other, it is inconvenient for a user to recognize or confirm a current power mode of the image forming apparatus.

For example, assuming that a user wants to send a printing command for a printing operation to a distant image forming apparatus which is to enter a power save mode in 1 minute, by the time an actual printing command is received, the image forming apparatus might already have entered the power save mode and may need to perform the warm-up in order to perform the printing operation. In this case, it is impossible to recognize and change an entering time when the image forming apparatus enters the power save mode according to a user's demand.

SUMMARY OF THE INVENTION

Accordingly, it is an aspect of the present invention to provide a host apparatus which can inform a user of an entering time when an image forming apparatus enters a power save mode, and a power save mode control method thereof.

Another aspect of the present invention is to provide a host apparatus which can change an entering time when an image forming apparatus enters a power save mode, and a power save mode control method thereof.

Additional aspects of the present invention will be set forth in part in the description which follows and, in part, will be obvious from the description, or may be learned by practice of the present invention.

The foregoing and/or other aspects of the present invention can be achieved by a method of controlling a power save mode of an image forming apparatus connected to a host apparatus, the method including: requesting information on a power mode of the image forming apparatus; transmitting the power mode information and information on an entering time for a power save mode of the image forming apparatus from the image forming apparatus; and displaying the entering time for the power save mode of the image forming apparatus on the basis of the entering time information to enable control of the power save mode of the image forming apparatus.

In aspects of the present invention, the displaying of the entering time includes displaying the power mode information transmitted from the image forming apparatus.

In aspects of the present invention, the entering time may include at least one of a point in time when the image forming apparatus enters the power save mode and a remaining time until entering the power save mode.

In aspects of the present invention, the power save mode control method may further include changing the entering time according to a user's input.

In aspects of the present invention, the changing of the entering time may include setting entering time to maintain a normal mode or to end the normal mode and enter the power save mode based on the user's input.

In aspects of the present invention, the changing of the entering time may include changing the entering time according to a requesting priority if there are a plurality of requests for changing the entering time from a plurality of host apparatuses.

In aspects of the present invention, the requesting priority may be set on a basis of a remaining time until entering the power save mode.

In aspects of the present invention, the displaying of the entering time may include receiving the entering time information from the image forming apparatus and updating the displayed entering time.

In aspects of the present invention, the entering time may be displayed through a user interface of at least one of a printer driver and an application corresponding to the host apparatus.

In aspects of the present invention, the entering time may be displayed on a display part of the image forming apparatus.

The foregoing and/or other aspects of the present invention can be achieved by a host apparatus connected to an image forming apparatus having a reservation function for entering a power save mode, including: a display part; a communication part which communicates with the image forming apparatus; and a controller which receives information on a power mode of the image forming apparatus and information on an entering time for a power save mode of the image forming apparatus from the image forming apparatus and controls the display part to display the entering time on a basis of the entering time information.

In aspects of the present invention, the controller may control the display part to further display the power mode information received from the image forming apparatus.

In aspects of the present invention, the entering time may include at least one of a point in time when the image forming apparatus enters the power save mode and a remaining time until entering the power save mode.

In aspects of the present invention, the host apparatus may further include a user input part used for a user's input, wherein the controller transmits a command for changing the entering time according to the user's input.

In aspects of the present invention, the controller may transmit a command for maintaining a normal mode or for ending the normal mode and entering the power save mode based on the user's input.

In aspects of the present invention, the controller may receive the entering time information from the image forming apparatus and controls the display part to update the displayed entering time.

In aspects of the present invention, the receiving the power mode information and the entering time information and the entering time for the power save mode may be displayed through a user interface of at least one of a printer driver and an application corresponding to the host apparatus.

According to an aspect of the present invention, a method of controlling a power save mode of an image forming apparatus connected to a host apparatus includes: receiving power mode information on a power mode of the image forming apparatus using the host apparatus; setting an entering time of the image forming apparatus to enter the power save mode where power is not supplied to components thereof that perform a printing operation, using the host apparatus; and sending the set entering time from the host apparatus to the image forming apparatus so that the image forming apparatus enters the power save mode according to the set entering time, thereby controlling the power save mode of the image forming apparatus.

According to an aspect of the present invention, a method of controlling a power save mode of an image forming apparatus connected to a host apparatus includes: setting an entering time of the image forming apparatus to enter the power save mode where power is not supplied to components thereof that perform a printing operation, using the image forming apparatus so that image forming apparatus enters the power save mode according to the set entering time; and sending the set entering time from the image forming apparatus to the host apparatus so that the host apparatus receives the set entering time at the image forming apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
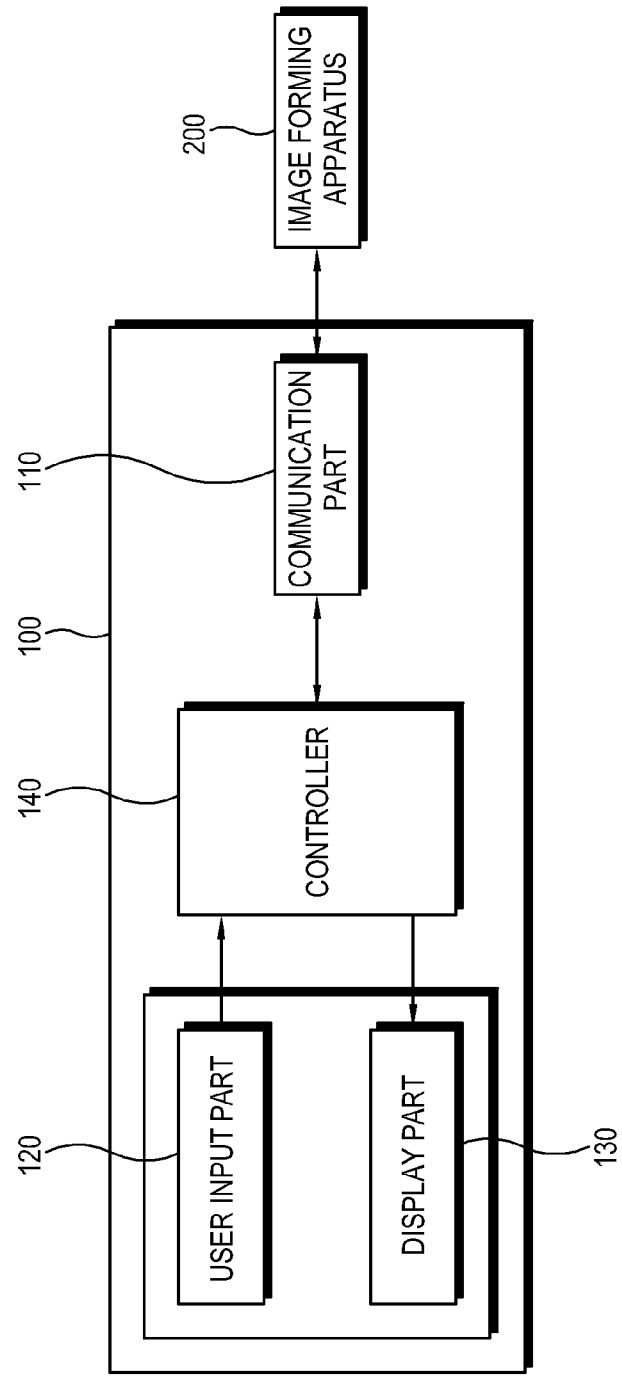
FIG. 1 is a block diagram illustrating a host apparatus and an image forming apparatus according to an aspect of the present invention.

Reference will now be made in detail to aspects of the present invention, examples of which are illustrated in the accompanying drawings, wherein like reference numerals refer to like elements throughout. The aspects are described below in order to explain the present invention by referring to the figures.

In aspects of the present invention, entering time may refer to a point in time when an image forming apparatus enters a power save mode, or a remaining time (or an amount of time remaining) until the image forming apparatus enters the power save mode.

FIG. 1 is a block diagram illustrating a host apparatus 100 and an image forming apparatus 200 according to an aspect of the present invention. The host apparatus 100 can be a computer system or the like, and performs data communication with the image forming apparatus 200, such as, a printer, a multi function device, copier, or the like. The host apparatus 100 transmits printing data, such as, a text and/or an image of a document to be printed, to the image forming apparatus 200.

The image forming apparatus 200 prints an image on a printing medium on the basis of the printing data. The image forming apparatus 200 may utilize an electrophotographic printing technique to perform a printing operation. According to aspects of the present invention, the image forming apparatus 200 has a reservation function for entering a power save mode. A power save mode refers to a mode of the image forming apparatus 200 in which power supply to some components of the image forming apparatus 200 is cut off while the image forming apparatus 200 does not perform the printing operation for a predetermined time in order to reduce power consumption of the image forming apparatus 200.

The image forming apparatus 200 automatically enters into the power save mode after a predetermined time when the image forming apparatus 200 does not perform the printing operation, which is referred to as the 'reservation function' of the image forming apparatus 200. The reservation function may be set by a user.

If the image forming apparatus 200 receives printing data while in the power save mode due to the reservation function, the image forming apparatus 200 returns to a normal mode for warm-up where electric power is supplied to the components in which electric power has been cut off. After the warm-up, the image forming apparatus 200 enters a ready state for instantly performing the printing operation. The image forming apparatus 200 may include a display part (not shown) for displaying information on a power mode thereof, information on an entering time for the power save mode, etc.

As shown in FIG. 1, the host apparatus 100 includes a communication part 110, a user input part 120, a display part 130, and a controller 140. The host apparatus 100 may further include an image processing part (not shown) which generates printing data for a document to be printed.

Figure 2:
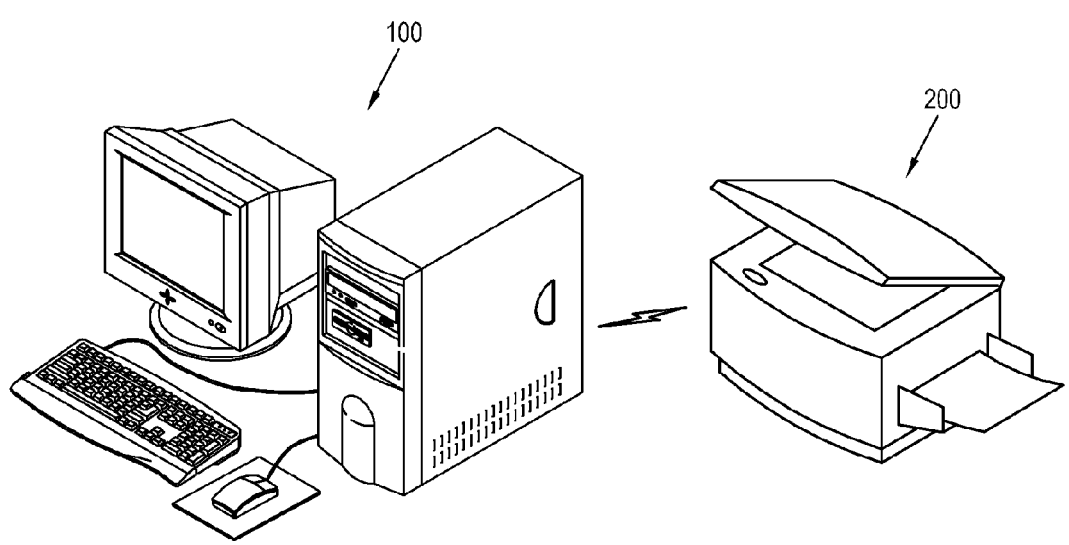
FIG. 2 represents data communication between the host apparatus and the image forming apparatus of FIG. 1.

The communication part 110 of the host apparatus 100 performs data communication with the image forming apparatus 200 under the control of the controller 140, as shown in FIG. 2. That is, the communication part 110 transmits printing data to the image forming apparatus 200 and may request the image forming apparatus 200 for information on the power mode thereof. Then, the host apparatus 100 receives the power mode information from the image forming apparatus 200 and information on the entering time when the image forming apparatus 200 enters the power save mode (hereinafter, referred to as 'entering time information'). Here, the power mode information includes information on whether the power mode is the normal mode or the power save mode.

Referring back to FIG. 1, the communication part 110 can be a wired or wireless communication module which can be connected to the image forming apparatus 200 through a network. For example, the host apparatus 100 and the image forming apparatus 200 may communicate with each other while distantly spaced as shown in FIG. 2.

The user input part 120 receives a user's command to display and change the entering time for the power save mode and transmits the user's command to the controller 140. The user input part 120 may be provided as a mouse, a keyboard, a touch pad, or the like.

The display part 130 displays the power mode information received from the image forming apparatus 200 and the entering time on the basis of the entering time information. The display part 130 may include a thin film transistor-liquid crystal display (TFT-LCD), and a driving part (not shown) to drive the TFT-LCD. The display part 130 may display a user interface (referred to as reference numeral 10 in FIG. 3) of at least one of a printer driver and an application corresponding to the image forming apparatus 200 under the control of the controller 140. In aspects of the present invention, the user interface is a graphic user interface (GUI).

The controller 140 controls the communication part 110 and the display part 130 to inform a user of the entering time of the image forming apparatus 200. The controller 140 may determine whether the image forming apparatus 200 enters the power save mode from the normal mode through the communication part 110. If it is determined that the image forming apparatus 200 is to enter the power save mode, the controller 140 controls the display part 130 to display the entering time when the image forming apparatus 200 enters the power save mode. Here, the controller 140 may receive the entering time information from the image forming apparatus 200 and control the display part 130 to display the entering time on the basis of the received entering time information.

Figure 3:
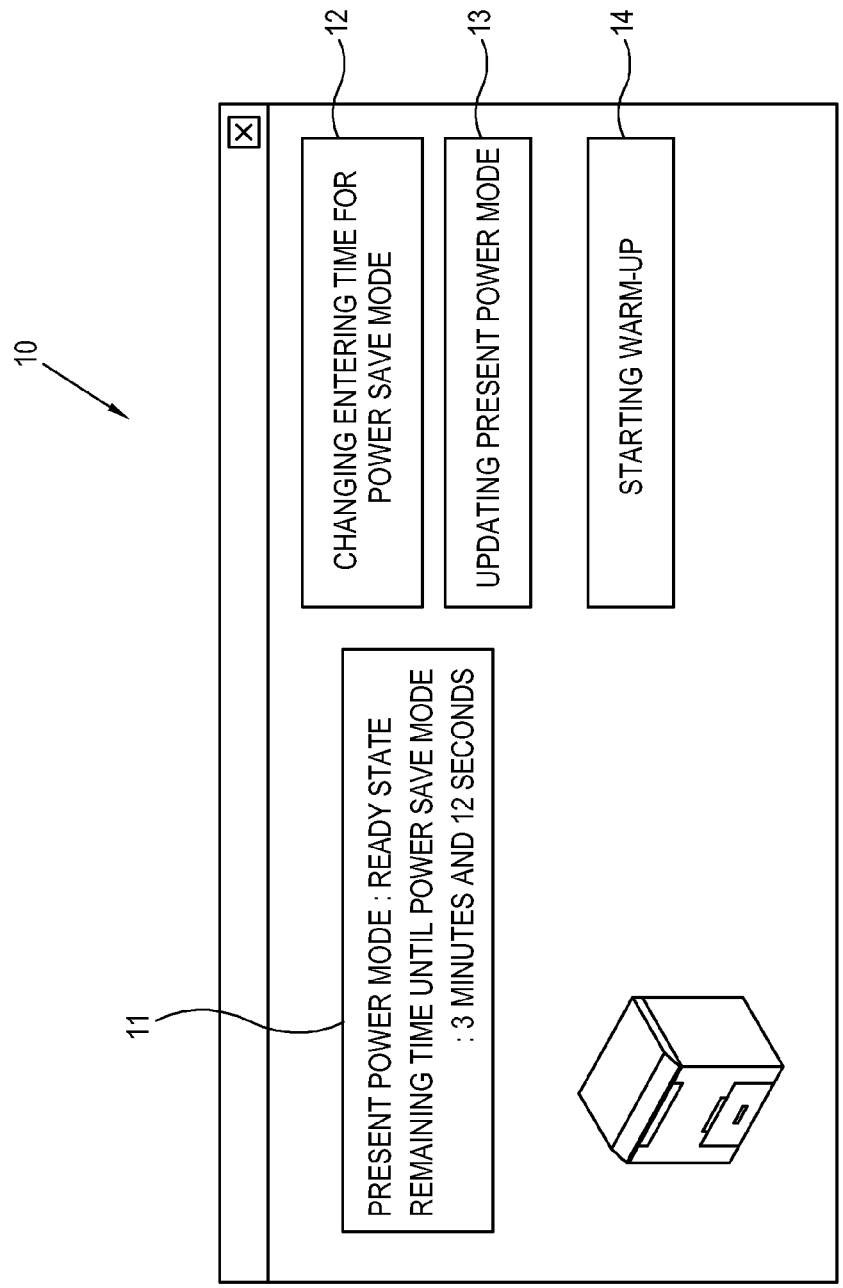
FIG. 3 illustrates a user interface according to an aspect of the present invention.

FIG. 3 illustrates a user interface according to an aspect of the present invention. Specifically, as shown in FIG. 3, the controller 140 generates the user interface 10 and displays the user interface 10 on the display part 130. The user interface 10 may include at least one of menus corresponding to a display window 11 on which a present power mode and the entering time for the power save mode are displayed, an entering time change button 12, a power mode update button 13, and a warm-up start button 14. Although not shown, a power save mode button to cause the image forming apparatus to immediately enter into the power save mode may be used in other aspects of the present invention.

As shown in FIG. 3, the entering time to be displayed may include one of a point in time when the image forming apparatus 200 enters the power save mode and a remaining time until the image forming apparatus 200 enters the power save mode. For example, referring to FIG. 3, the controller 140 may control the display part 130 to display the present power mode, which may be the normal mode, or the ready state, through the display window 11 of the user interface 10, and to display the remaining time until the power save mode is entered. Here, the controller 140 may control the display part 130 so that the entering time is a point in time when the image forming apparatus 200 enters the power save mode.

The entering time for the power save mode may be changed according to a user's input through the entering time change button 12. The change in the entering time may be transmitted to the image forming apparatus 200. That is, if a user selects the entering time change button 12, the controller 140 controls output of a user interface for changing the entering time (not shown) on the display part 130 so that a remaining time until the power save mode can be changed or the point in time of entering the power save mode can be inputted through the user input part 120.

Here, if the remaining time is set to 0, the controller 140 transmits a command for ending the normal mode and entering the power save mode to the image forming apparatus 200 through the communication part 110. On the other hand, if the normal mode is set to be maintained, the controller 140 transmits a command for maintaining the normal mode to the image forming apparatus 200, and accordingly, the image forming apparatus 200 maintains the normal mode. Thereafter, the controller 140 may re-receive the entering time information from the image forming apparatus 200 according to a user's input through the entering time update button 13, and may control the display part 130 to update the displayed entering time. In other aspects of the present invention, the normal mode may be maintained by selecting a normal mode button (not shown). Selection of the normal mode button may add a predetermined amount of time to the entering time, or may simply maintain the normal mode indefinitely, for example.

According to another aspect of the present invention, the image forming apparatus 200 can receive requests for changing the entering time for the power save mode from a plurality of host apparatuses 100. Here, the image forming apparatus 200 may change the entering time for the power save mode according to a predetermined requesting priority. For example, when a plurality of requests of entering time are received by the image forming apparatus 200, a maximum value of the remaining time from among the plurality of requests may have priority, or a request inputted from the host apparatus 100 of an administrator from among the plurality of host apparatuses 100 may have priority.

The controller 140 may receive the entering time information from the image forming apparatus 200 through the communication part 110 according to a user's input through the power mode update button 13, and may control the display part 130 to update the power mode and the entering time displayed on the display window 11. That is, if the image forming apparatus 200 receives the entering time change request from the plurality of host apparatuses 100 and changes the entering time according to the predetermined requesting priority, the entering time display needs to be updated in all other host apparatuses 100 except for the host apparatus 100 having the requesting priority that may be preset. Accordingly, if a user selects the power mode update button 13, the controller 140 controls updating or refreshing of the display window 11 of the user interface 10 in the host apparatus 100.

The controller 140 may control the updating of the present power mode and the entering time according to a user's input, or periodically or randomly. On the other hand, if the present power mode of the image forming apparatus 200 is the power save mode, a user may select the warm-up start button 14 to transmit a warm-up start command for entering the normal mode to the image forming apparatus 200. Accordingly, the image forming apparatus 200 receives the warm-up start command and enters the normal mode.

The operations such as determination of entering the power save mode by the controller 140, the displaying, changing, and updating of the entering time, and the issuing of the warm-up start command may be implemented by a printer driver, a network application, or the like of (or corresponding to) the image forming apparatus 200.

Figure 4:
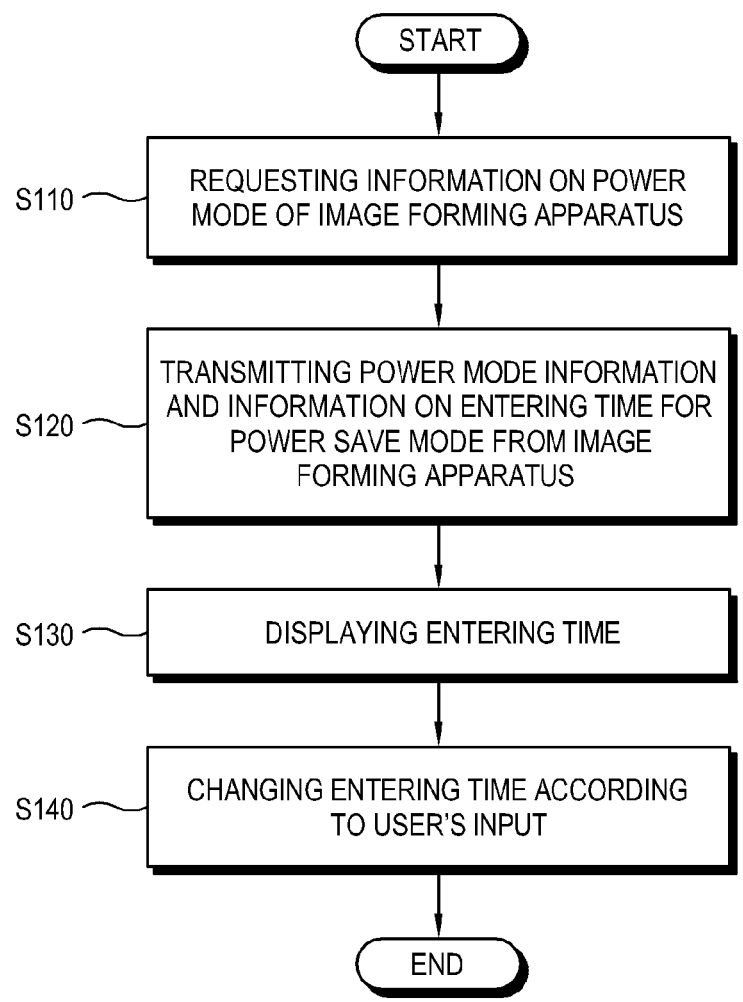
FIGS. 4 and 5 are flowcharts for illustrating a power save mode control method according to an aspect of the present invention.

Hereinafter, a power save mode control method of the image forming apparatus 200 in the host apparatus 100 will be described in reference to FIGS. 4 and 5. Referring to FIG. 4, the host apparatus 100 may request information on a power mode of the image forming apparatus 200 through the communication part (operation S110). In aspects of the present invention, the image forming apparatus may send the information on a power mode as an update on its own periodically.

The image forming apparatus 200 transmits the power mode information and information on a power save mode entering time (referred to as entering time information) to the host apparatus 100 in response to the request (operation S120). Here, the controller 140 of the host apparatus 100 receives the power mode information and the entering time information of the image forming apparatus 200 through the communication part 110, and determines whether the present power mode is the normal mode or the power save mode on the basis of the received information.

If it is determined that the image forming apparatus 200 enters the power save mode, the controller 140 controls the display part 130 to display the power mode and the entering time for the power save mode (operation S130). Here, the entering time may be displayed on a user interface of the printer driver, an application corresponding to the host apparatus 100, or both. The entering time may be displayed on the display part (not shown) of the image forming apparatus 200. The displayed entering time may include one of the point in time for entering the power save mode or the remaining time until entering the power save mode.

Thereafter, the controller 140 may change the entering time according to a user's input (operation S140). That is, a user may input the point in time for entering the power save mode or the remaining time until entering the power save mode. Here, the controller 140 may set the remaining time into 0 according to the user's input to end the normal mode and enter the power save mode, or may set the normal mode to be maintained. In various aspects, the normal mode may be maintained for a predetermined set time, for example, or indefinitely.

If there are requests for changing the entering time from the plurality of host apparatuses 100 in the operation S130, the image forming apparatus 200 may change the entering time according to a requesting priority. The priority may be set on the basis of the remaining time (for example, a maximum value of the remaining times) or on the basis of any one of the plurality of host apparatuses 100 that may have a preset priority.

Figure 5:
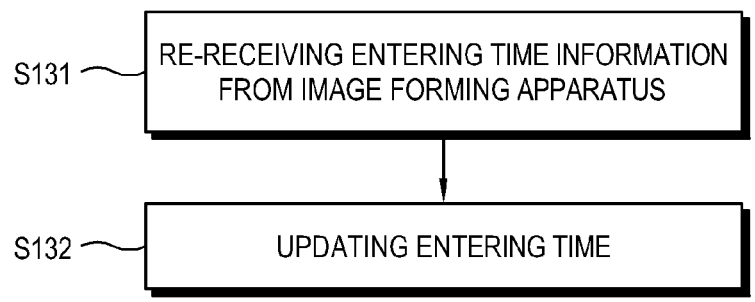

Referring to FIG. 5, in operation 130 shown in FIG. 4, the controller 140 may re-receive the entering time information of the image forming apparatus 200 through the communication part 110 (operation S131). If the entering time information of the image forming apparatus 200 is changed, the controller 140 may control the display part 130 to update the displayed entering time (operation S132). Here, the updating may be performed periodically or randomly, or may be performed by a command of a user.

As described above, according to aspects of the present invention, a host apparatus can inform a user of an entering time when an image forming apparatus enters a power save mode. Further, the host apparatus can change the entering time when the image forming apparatus enters the power save mode.

As described above, in aspects of the present invention, entering time may refer to a point in time when an image forming apparatus enters a power save mode or a remaining time until the image forming apparatus enters the power save mode. The point in time may refer to a time on a preset clock, for example, of the host apparatus 100, or a time of day.

In aspects of the present invention, instead of using a host apparatus, setting an entering time may be performed using a module included in the image forming apparatus by a user. In that case, the host apparatus may be informed of such direct setting of the entering time at the image forming apparatus.

In various aspects, at least one of and and/or refer to alternatives chosen from available elements so as to include one or more of the elements. For example, if the elements available include elements X, Y, and Z, at least one of and and/or refer to X, Y, Z, or any combination thereof.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A method of controlling a power save mode of an image forming apparatus connected to a host apparatus, the method comprising:
   requesting information on a power mode of the image forming apparatus by the host apparatus;
   transmitting the power mode information and information on an entering time for a power save mode of the image forming apparatus from the image forming apparatus to the host apparatus;
   displaying the entering time for the power save mode of the image forming apparatus on the basis of the entering time information to enable control of the power save mode of the image forming apparatus at the host apparatus; and
   changing the value of the entering time to another value according to a user's input of a user-changeable value at the host apparatus,
   wherein, if there are a plurality of requests for changing the value of the entering time from a plurality of host apparatuses, the changing the value of the entering time comprises changing the value of the entering time according to a requesting priority which is preset, and
   the method further comprises receiving the entering time information again from the image forming apparatus according to a user's input, or periodically, or randomly, and updating the displayed entering time in all other host apparatuses as well as a host apparatus having the requesting priority.

2. The power save mode control method according to claim 1, wherein the displaying of the entering time includes displaying the power mode information transmitted from the image forming apparatus.

3. The power save mode control method according to claim 1, wherein the entering time comprises at least one of a point in time when the image forming apparatus enters the power save mode and a remaining time until entering the power save mode.

4. The power save mode control method according to claim 1, wherein the changing of the displayed entering time comprises setting the entering time to maintain a normal mode or to end the normal mode and enter the power save mode based on the user's input.

5. The power save mode control method according to claim 1, wherein the entering time is displayed through a user interface of at least one of a printer driver and an application corresponding to the host apparatus.

6. The power save mode control method according to claim 1, wherein the entering time is displayed on a display part of the image forming apparatus.

7. A non-transitory computer readable recording medium storing a program to implement the method of claim 1.

8. A method of controlling a power save mode of an image forming apparatus connected to a host apparatus, the method comprising:
   requesting information on a power mode of the image forming apparatus by the host apparatus;

transmitting the power mode information and information on an entering time for a power save mode of the image forming apparatus from the image forming apparatus to the host apparatus;

displaying the entering time for the power save mode of the image forming apparatus on the basis of the entering time information to enable control of the power save mode of the image forming apparatus at the host apparatus; and changing the value of the entering time to another value according to a user's input at the host apparatus, wherein the changing the value of the entering time comprises changing the value of the entering time according to a requesting priority if there are a plurality of requests for changing the value of the entering time from a plurality of host apparatuses, wherein the displaying of the entering time comprises receiving the entering time information from the image forming apparatus and updating the displayed entering time according to a user's input, or periodically, or randomly, and wherein the requesting priority is set on a basis of a remaining time until entering the power save mode.

9. A host apparatus connected to an image forming apparatus having a reservation function for entering a power save mode, the host apparatus comprising:

a display part;

a user input part used for a user's input of a user-changeable value;

a communication part that communicates with the image forming apparatus; and a controller that controls the communication part to receive information on a power mode of the image forming apparatus and information on an entering time for a power save mode of the image forming apparatus from the image forming apparatus, controls the display part of the host apparatus to display the entering time on a basis of the entering time information, and controls the communication part to transmit a command for changing the value of the entering time to another value to the image forming apparatus according to the user's input at the host apparatus, wherein, if there are a plurality of requests for changing the value of the entering time from a plurality of host apparatuses, the changing the value of the entering time comprises changing the value of the entering time according to a requesting priority which is preset, and wherein the controller controls the communication part to receive the entering time information again from the image forming apparatus according to a user's input, or periodically, or randomly, and the display part to update the displayed entering time in all other host apparatuses as well as a host apparatus having the requesting priority.

10. The host apparatus according to claim 9, wherein the controller controls the display part to further display the power mode information received from the image forming apparatus.

11. The host apparatus according to claim 9, wherein the entering time comprises at least one of a point in time when the image forming apparatus enters the power save mode and a remaining time until entering the power save mode.

12. The host apparatus according to claim 9, wherein the controller controls the communication part to transmit a command for maintaining a normal mode or for ending the normal mode and entering the power save mode based on the user's input.

13. The host apparatus according to claim 9, wherein the receiving the power mode information and the entering time information and the entering time for the power save mode are displayed through a user interface of at least one of a printer driver and an application corresponding to the host apparatus.

14. A method of controlling a power save mode of an image forming apparatus connected to a host apparatus, the method comprising:

receiving power mode information on a power mode of the image forming apparatus at the host apparatus;

setting an entering time for a power save mode of the image forming apparatus to enter the power save mode, where power is not supplied to components thereof that perform a printing operation, at the host apparatus;

sending the set entering time from the host apparatus to the image forming apparatus so that the image forming apparatus enters the power save mode according to the set entering time, thereby controlling the power save mode of the image forming apparatus;

changing the value of the set entering time to another value according to a user's input of a user-changeable value at the host apparatus; and displaying the entering time at the host apparatus by receiving the entering time information from the image forming apparatus, wherein, if there are a plurality of requests for changing the value of the entering time from a plurality of host apparatuses, the changing the value of the set entering time comprises changing the value of the set entering time according to a requesting priority which is preset, and the displaying the entering time comprises updating the displayed entering time in all other host apparatuses as well as a host apparatus having the requesting priority according to a user's input, or periodically, or randomly, by receiving the power mode information again from the image forming apparatus.

15. The method of claim 14, wherein the setting of the entering time is performed using a graphic user interface (GUI) displayed by a display of the host apparatus, and the GUI is of a driver of the image forming apparatus.

16. The method of claim 14, further comprising periodically sending the power mode information on the power mode as an update by the image forming apparatus to the host apparatus.

17. A non-transitory computer readable recording medium storing a program to implement the method of claim 14.

* * * * *